United States Patent [19]

Bruce

[11] Patent Number: 4,513,375

[45] Date of Patent: Apr. 23, 1985

[54] TRANSACTION NUMBERING APPARATUS

[76] Inventor: Robert M. Bruce, 14625 Rayen St., Apt. #110, Panorama City, Calif. 91402

[21] Appl. No.: 409,114

[22] Filed: Aug. 18, 1982

[51] Int. Cl.³ .............................................. G06F 15/21
[52] U.S. Cl. .............................. 364/401; 340/347 DD; 377/33
[58] Field of Search ................................ 364/400–409, 364/200 MS File, 900 MS File; 235/3, 310; 340/347 DD; 377/1, 6, 8, 33–36

[56] References Cited

U.S. PATENT DOCUMENTS

| | | | |
|---|---|---|---|
| 2,668,009 | 2/1954 | Schmidt | 364/401 X |
| 2,801,406 | 7/1957 | Lubkin | 377/35 X |
| 3,314,049 | 4/1967 | Felcheck | 364/401 X |
| 3,622,995 | 11/1971 | Dilks et al. | 364/407 X |
| 3,953,846 | 4/1976 | Ekeland | 340/347 DD X |
| 4,053,735 | 10/1977 | Foudos | 364/401 X |
| 4,276,598 | 6/1981 | Inoue et al. | 364/405 |
| 4,360,872 | 11/1982 | Suzuki et al. | 364/405 |
| 4,412,304 | 10/1983 | Yamakita | 364/900 |
| 4,449,186 | 5/1984 | Kelly et al. | 364/407 |

Primary Examiner—Jerry Smith
Assistant Examiner—Gary V. Harkcom
Attorney, Agent, or Firm—G. Donald Weber, Jr.

[57] ABSTRACT

An apparatus, method and system for identifying, recording, and marking transactions such as, but not limited to, individual business agreements or specific events such as occurring in the commercialization of goods or services. An apparatus comprising a non-numeric memory system, one or more numeric memory registers, a marking means, a means to initialize the alphabetic memory system and numeric registers and means to increment the various alphabetic memory system and numeric registers so as to uniquely identify consecutive events or transactions. The invention has the operability to move the series print position of the non-numeric memory system and the one or more numeric memory registers at various times during the usage of the invention, thereby economizing on the number of characters required to identify a predetermined number of events or transactions.

15 Claims, 1 Drawing Figure

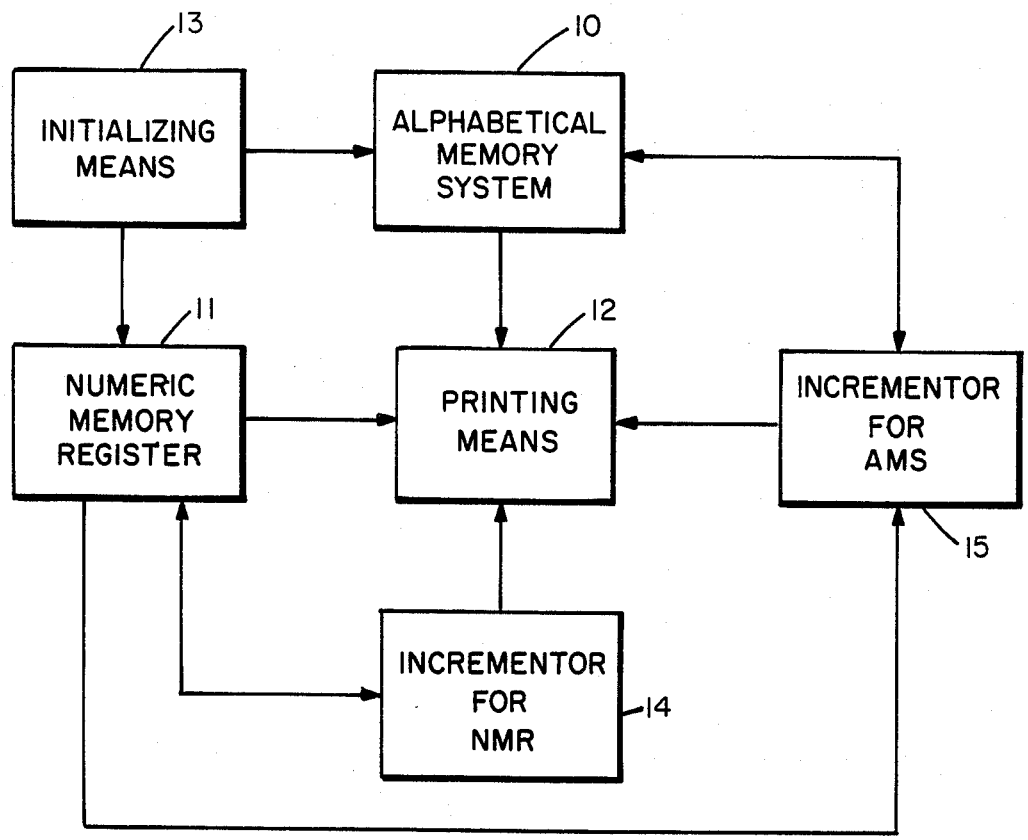

TRANSACTION NUMBERING APPARATUS

BACKGROUND OF THE INVENTION

In today's business world, information on various transactions is generally identified, recorded, or marked by various numbering systems. For example, a single item of merchandise frequently contains a price, a number which refers to its size, shape, color, or quality, the dates the item was made, shipped from factory, or received at one or more points in the chain of commerce, as well as other numbers used for various purposes. The storage and inventory of these various numbers has become a problem in and of itself. The more numbers, and by this is also meant the number of characters in each number, the more difficult it is to remember and use them without error, and the more storage capacity is required in an information retrieval device such as, for example, a computer. Accordingly, there is a rapidly growing demand and need for a method or system for economizing on the amount of numbers required for conducting various transactions. This invention is an improvement on the various apparatuses, systems and methods presently used for identifying, recording and marking various commercial transactions. This invention uses a method or system, and the apparatus for identifying, recording and marking transactions, which economizes on the number of characters required to identify such transactions. Also, each "number", hereinafter referred to as "transaction number", created by this invention will be unique within the system itself.

Many people in business who are responsible for verifying accounts payable, or checking of accounts received, or checking or tracing lost invoices and the like are continuously overwhelmed by the volumes of transaction numbers they face. Many people are simply intimidated by large transaction numbers. Thus, there is a very good business reason to reduce transaction numbers to simpler numbers. My invention provides a system for reducing the length of transaction numbers thus providing less opportunity for error and hence greater clarity and efficiency. For example, if the present zip code system employed by the Postal Service used my invention, there can be 11.5 times more zip codes than presently exist while still using only five characters.

When comparing two transactions or events for sequence, using present means of recording or marking, it may be necessary to compare "year", "month", "day", "hour", "minute" and perhaps "second". Whereas, using a numbering system marked by my invention, the transactions or events are recorded as occurrences along a predetermined sequence and the order of occurrence is explained by my transaction numbers. In other words, events are cross-referenced in terms of the sequence—not in terms of calendar time (i.e., keeping score by innings rather than a time clock). After all, calendar time is essentially a cross-reference of celestial phenomena, an agreed upon system for recording "time". My invention is an apparatus or system for the recordation of occurrences.

SUMMARY OF THE INVENTION

This invention is a method or system for identifying, recording, and marking transactions such as, but not limited to, individual business agreements, particularly individual or specific sales of goods or services, or specific events such as production or storage of goods. This invention is also directed to the apparatus or system for carrying out such method. This invention is concerned with and directed to economizing the number of characters required for identifying transactions.

As an example of the efficiency of this invention, common ordinary number systems which are, for example, limited to six characters provide 999,999 numbers, i.e., 1 to 999,999. (That is, 0 is considered to be an invalid number.) Whereas, in one embodiment of my invention, a six-character system will provide 13,799,999 numbers which represents an improved efficiency and economy of about 1380 percent.

This invention is a method or system and apparatus for labeling each transaction and separating such transactions from each other, while placing all transactions in an orderly, understandable sequence. The invention is particularly well-suited for recording, sorting, and compiling by computer. Further, because of the novel features of this invention, as will be explained more fully below, this invention makes this system, apparatus or method of identifying recording or making transactions readily recognizable by its users and by so doing improves the gathering, assimilation, and dissemination of business data.

In general, the system numbers and labels transactions in a progressive sequence using characters easily understood and quickly recognized. In general, the system generates a sequential series of characters which are progressively numbered. The series of characters can be generated by an apparatus or machine, such as, but not limited to, an electronic circuit. In a manner somewhat analogous to an office time clock, the transaction document can be inserted into (or prepared by) a machine designed for this system and a transaction number applied to the document. Each transaction number is later than the immediately preceding transaction number by one, regardless of the time interval between consecutive numbers. Thus, each transaction number is one later than the previous transaction number. Thus, the transaction numbers are used to number individual events which occur with the passing of time. Accordingly, the next transaction number, for example stamped on a document, is later by one than the immediate previously stamped transaction number.

In general, the transaction numbers occur in a progressive, consecutive sequence and, as such, it is understood that no two transaction numbers can be the same, thereby assuring separate identity for each transaction.

Transaction numbers occur in various series with the transaction series being predetermined by the anticipated total of such transactions expected over a predetermined period of time. Each transaction series has a constant predetermined number of consecutive characters assigned to each transaction number. For example, in one embodiment of this invention, if the total transactions anticipated to occur over a five year period is between 1,150,000 and 13,999,999, then a transaction series consisting of six characters would be selected. This means that each transaction number in this transaction series consists of exactly six characters. Where the anticipated number of total transactions is between 91,999 and 1,149,999, then in another embodiment of this invention a transaction series consisting of five characters would be selected. It can be appreciated that where ordinary numbers are used entirely for number transactions that the total number of transactions possible in a five character series is 99,999. Thus, in this particular embodiment of my invention, which will be more fully described below, approximately 1150 percent more numbers are available. Transaction numbers therefore are members of a transaction series and every transaction number of a particular transaction series has the same number of characters. For example, in a transaction series of two characters, every transaction number in such a transaction series has exactly two characters. In a transaction series of three characters, every transaction number has exactly three characters and so on.

A novel feature of a preferred embodiment of my invention is that every transaction number has one and only one non-numeric character while all the other characters in any transaction number are numeric characters. To facilitate immediate recognition of a transaction number by a use of my invention, the non-numeric character preferrably is different in size, color, or both from the numeric characters. For example: a four-character transaction number could be "a123"; a five-character transaction number could be "1b234"; and a seven-character transaction number could be "123c456". In general, the transaction numbers of my invention must contain one or more numeric characters but only one non-numeric character.

The progressive, consecutive aspect of the transaction numbers is similar to regular numbers in that "2" is later than "1"; "3" is later than "2", and so on. Regarding the non-numeric characters in a transaction series, in a preferred embodiment of my invention, lower case alphabetical letters are used with the exception of "i", "l", and "o", which are not used to avoid possible confusion with the numeric characters "1" and "0". In this embodiment, "b" is later than "a" and "c" is later than "b", and so on. In other words, the progressive, consecutive aspect is determined by the alphabetical order of the non-numeric or alphabetical character. Furthermore, the position of the non-numeric or alphabetical character in the transaction number is somewhat analogous to the use of a decimal point in decimal numbers. For example, "1234." is greater than "123.4", which is greater than "12.34", which is greater than "1.234", which is greater than ".1234". Here, as the decimal point moves from the farthest left position to the farthest right position, the decimal number becomes greater. In the transaction numbers of this invention, "1234a" is later than "123a4", which is later than "12a34", which is later than "1a234", which is later than "a1234". Thus, as the non-numeric or alphabetical character in a transaction number moves from the farthest left hand position in the sequential series of characters in a transaction number to the right, the transaction number becomes later. It is important to realize that transaction numbers label events or transactions which are defined by the user and represent a progression along a sequence of occurrences spaced by the passing of time. The amount of time between each individual event, or occurrence, or transaction is not important, only the time-order is important:

Because each transaction number of this invention has a single non-numeric character, my transaction numbers are easily recognizable from all other numbers, especially those which consist only of numeric characters. Thus, the transaction numbers of this invention offer two advantages: (1) instantaneous recognition by the user over other numbers used in business, and (2) economy of space since fewer characters are required to label transactions.

One embodiment of my invention is a consecutive transaction numbering apparatus comprising an alphabetical memory system 10, herein sometimes referred to as "AMS", having operable accessibility to a predetermined number of unique Roman alphabetical characters in alphabetical retrievable order. The AMS is designed so that it has a print position for one and only one of the alphabetical characters at a time. By "print position", as used herein, is meant a condition of a memory system which renders such system operable for printing, stamping marking, or designating a document, transaction or event recordation, whether or not such notations are directly perceptible by the human senses or perceptible with the aid of a device capable of making such notations directly perceptible.

In this embodiment, the apparatus also comprises at least one numeric memory register 11, herein sometimes referred to as "NMR". Each NMR has operable accessability to all 10 arabic numerals in numerical retrievable order. Each NMR is designed so that it has a print position for one and only one of the numeric characters at a time.

The apparatus further comprises a printing means 12, operable for marking on a transaction a transaction number which consists of one and only one character from each of the numeric memory registers 11 and from the AMS 10, such that such printed transaction number is arranged in adjacent sequential order. By "marking" as used herein is meant printing, stamping, impressing, or designating a document, transaction or event whether or not such marking is directly perceptible by the human senses or perceptible with the aid of a device capable of making such marking directly perceptible.

By the expression "series print position" as used herein, is meant the sequential order of a character in a NMR or AMS in print position relative to the sequential order of the characters in all other NMR's and AMS in print position. For example, for the transaction number "67g89", the "6" is in the first series print position, the "7" is in the second series print position, the "g" is in the third series print position, the "8" is in the fourth series print position, and the "9" is in the fifth series print position. The "6" may also be said to be in the series print position farthest to the left, and the "9" in the series print position farthest to the right.

The apparatus further comprises an initializing means 13 to initialize each of the NMR's and the AMS so that (i) the AMS has its first-in-alphabetical-order character in print position; (ii) so that the AMS is in the series print position farthest to the left relative to the series print position of each of the NMR's; (iii) so that each NMR, except the NMR in the farthest right series print position, has a "0" in the print position; and (iv) so that each NMR in the farthest right series print position has a "1" in its print position.

The apparatus also comprises an incrementing means 14 to increment as a group the numeric characters which are in the print position by one. Such incrementation occurs after the marking, or in one embodiment, the printing of a transaction number on a transaction. The means to increment also is operable, when all numeric characters in the print position are "9", to advance all numeric characters in the print position to "0" and to simultaneously interchange the series print position of the AMS with the series print position the NMR which is in the series print position immediately to the right of the AMS if a NMR is in a series print position immediately to the right of the AMS.

The apparatus further comprises an incrementing means 15 to increment the print position of the AMS when the series print position of the AMS is in the series print position farthest to the right relative to each NMR and all of the numeric characters in the print position are "9's". Incrementation of the AMS occurs after such transaction number has been marked on the transaction or transaction document. This means to increment the AMS is also operable to reposition the series print position of the AMS by shifting it to the farthest series print position relative to the series print position of each NMR, and to shift the series print position of each NMR one series print position to the right of its former series print position, to advance each "9", which occupies the print position of each NMR to "0", and to advance the alphabetical character in the print position to the next alphabetical character in alphabetical order accessible to the AMS.

In one embodiment of this apparatus, the alphabetical characters operably accessible by the AMS are the following 23 letters:

a, b, c, d, e, f, g, h, j, k, m, n, p, q, r, s, t, u, v, w, x, y and z.

In some embodiments of this invention, the AMS may be said, in programmer jargon, to be programmer supplied or user supplied. In such embodiments, the source listing sets up the circuitry necessary to produce the transaction numbers. Such circuitry does not exist in such computers prior to its creation through the source listing.

In another embodiment of this apparatus, the total number of numeric memory registers is no greater than 9. In still another embodiment of this apparatus, the apparatus comprises an electronic computer system. Combinations of the various above-described embodiments, of course also are separate embodiments of this invention.

BRIEF DESCRIPTION OF THE DRAWINGS

The sole FIGURE is a block diagram of a system of the instant invention.

DESCRIPTION OF PREFERRED EMBODIMENTS

In my invention, any transaction series must have in each transaction number, one and only one non-numeric character and one or more numeric characters. Preferably, the non-numeric character is an alphabetical character. The simplest example of a transaction series of the type is one having only two characters. There are 459 distinct transaction numbers in this type of series compared to only 99 for a purely numeric character series, i.e., consisting only of integers. In abbreviated format Table 1, shows how each consecutive transaction number is formed, beginning with the first number "a1". The number to the left of the equal sign is the transaction number of a particular embodiment of this invention, while the number to the right of the equal sign represents the equivalent integer.

TABLE 1

|         | a1 = 1;  | a2 = 2;... | a9 = 9;  |
|---------|----------|------------|----------|
| 0a = 10;| 1a = 11; | 2a = 12;...| 9a = 19; |
| b0 = 20;| b1 = 21; | b2 = 22;...| b9 = 29; |
| 0b = 30;| 1b = 31; | 2b = 32;...| 9b = 39; |
| c0 = 40;| c1 = 41; | c2 = 42;...| c9 = 49; |
| 0c = 50;| 1c = 51; | 2c = 52;...| 9c = 59; |

TABLE 1-continued

| ... | ... | ... | ... |
|-----|-----|-----|-----|
| z0 = 440; | z1 = 441; | z2 = 442; | z9 = 449; |
| 0z = 450; | 1z = 451; | 2z = 452; | 9z = 459. |

As mentioned earlier, in my invention, alphabetical characters "i", "l" and "o" are not used, but the other 23 alphabetical letters are usually used. Deletion of the alphabetical characters "i", "l" and "o" prevent the inadvertent confusion with the numeric characters "0" and "1". This is important because quick recognition of my transaction numbers without possibility of confusion with other numbers is one of the advantages of my invention. Using any non-numeric or alphabetical character which could be confused with any numeric character would be defeating the purpose of this invention. It is to be understood that other non-numeric characters could be used, as for example, the Greek alphabet. Using the Roman alphabet is preferred because the sequential order of the letters in the alphabet is generally understood by everyone. For example, it is generally understood that "p" occurs later than "f" as clearly as "999" occurs later than "007".

A transaction series consisting of four characters is represented in part by the transaction numbers appearing in Table 2.

TABLE 2

| a001 = | 1;     | a002 = | 2;     | on to a999 = | 999    |
|--------|--------|--------|--------|--------------|--------|
| 0a00 = | 1,000; | 0a02 = | 1,002; | on to 9a99 = | 1,999  |
| 00a0 = | 2,000; | 00a2 = | 2,002; | on to 99a9 = | 2,999  |
| 000a = | 3,000; | 002a = | 3,002; | on to 999a = | 3,999  |
| b000 = | 4,000; | b002 = | 4,002; | on to b999 = | 4,999  |
| 0b00 = | 5,000; | 0b02 = | 5,002; | on to 9b99 = | 5,999  |
| 00b0 = | 6,000; | 00b2 = | 6,002; | on to 99b9 = | 6,999  |
| 000b = | 7,000; | 002b = | 7,002; | on to 999b = | 7,999  |
| c000 = | 8,000; | c002 = | 8,002; | on to c999 = | 8,999  |
| 0c00 = | 9,000; | 0c02 = | 9,002; | on to 9c99 = | 9,999  |
| 00c0 = | 10,000;| 00c2 = | 10,002;| on to 99c9 = | 10,999 |
| 000c = | 11,000;| 002c = | 11,002;| on to 999c = | 11,999 |

As shown in Table 2, 999 transaction numbers can be generated using the first alphabetical character "a" in the first position. Using the letter "a" in the second position allows for the formation of 1000 more transaction numbers. Shifting the letter "a", as shown above, from the first series print position to the second, then the third, and finally the fourth series print position, permits 3999 transaction numbers to be formed. Using the letter "b" in all four positions permits 4000 more transaction numbers to be formed. Using all Roman letters, except "i", "l" and "o", i.e., 23 Roman letters, permits $(4 \times 1000 \times 23) - 1 = 91,999$ transaction numbers to be formed. Thus, in a four character series, 91,999 transaction numbers can be formed in my invention. This is to be compared to 9999 numbers using entirely numeric characters. Thus, my invention permits about 920% more numbers to be formed using a four character series than that which can be formed using entirely numeric characters. In a six character series, my invention permits $(6 \times 100,000 \times 23) - 1 = 13,799,999$ separate and distinct transaction numbers to be formed.

In Table 3, the volume of transaction numbers which can be formed in my invention are compared to the volume that can be formed from purely numeric characters.

In one embodiment of my invention, my transaction numbers are converted to ordinary numbers. My inventive system can perform the conversion without any mathematical calculations as will be explained below.

In general, each transaction number has one non-numeric, preferably an alphabetical character. For example, in a transaction series of four characters, the alphabetical character could be in a series print position of one, two, three or four from the left. After determining the series print position of the alphabetical character, one may consult a conversion table, such as Table 4 for a four-character transaction series, to determine a prefix sub-series which consists entirely of numeric characters. Thus, the prefix sub-series, for a given transaction series, is determined from the identity and series print position of the non-numeric character in the transaction number. A suffix sub-series is then determined merely from the sequential order of the numeric characters without regard to the identity or series print position of the non-numeric character. For example, transaction numbers "9n75", "7n43", and "5n21" all have the same prefix sub-series, namely "45", see Table 4. However, each of these transaction numbers has a different suffix sub-series, namely "975", "743" and "521", respectively.

The conversion is completed by merely attaching the suffix sub-series to the end of the prefix sub-series. Thus, in the above example, the transaction numbers when converted to purely numeric decimal numbers becomes "45975", "45743", and "45521", respectively. Similar conversion tables are presented in Table 5 for a three character transaction series, Table 6 for a five character transaction series, Table 7 for a seven character transaction series, Table 8 for an eight character transaction series, Table 9 for a nine character transaction series, and Table 10 for a ten character transaction series. For example, a transaction number of 789n654321, using Table 10, has a prefix sub-series of "113" and a suffix sub-series of "789654321" which corresponds to the integer "113,789,654,321".

TABLE 3

| No. of Characters | No. of Transaction Nos. that can be formed | Maximum No. of numbers using all numeric characters | % Increase |
|---|---|---|---|
| 2 | (2 × 10 × 23) − 1 = 459 | 99 | 459 |
| 3 | (3 × 100 × 23) − 1 = 6,899 | 999 | 690 |
| 4 | (4 × 1000 × 23) − 1 = 91,999 | 9,999 | 920 |
| 5 | (5 × 10,000 × 23) − 1 = 1,149,999 | 99,999 | 1150 |
| 6 | (6 × 100,000 × 23) − 1 = 13,799,999 | 999,999 | 1380 |
| 7 | (7 × 1,000,000 × 23) − 1 = 160,000,000 | 9,999,999 | 1610 |
| 8 | (8 × 10,000,000 × 23) − 1 = 1,839,999,999 | 99,999,999 | 1840 |
| 9 | (9 × 100,000,000 × 23) − 1 = 20,699,999,999 | 999,999,999 | 2070 |
| 10 | (10 × 1,000,000,000 × 23) − 1 = 229,999,999,999 | 9,999,999,999 | 2300 |

TABLE 4

|   | P1 | P2 | P3 | P4 |
|---|----|----|----|----|
| a | 00 | 01 | 02 | 03 |
| b | 04 | 05 | 06 | 07 |
| c | 08 | 09 | 10 | 11 |
| d | 12 | 13 | 14 | 15 |
| e | 16 | 17 | 18 | 19 |
| f | 20 | 21 | 22 | 23 |
| g | 24 | 25 | 26 | 27 |
| h | 28 | 29 | 30 | 31 |
| j | 32 | 33 | 34 | 35 |
| k | 36 | 37 | 38 | 39 |
| m | 40 | 41 | 42 | 43 |
| n | 44 | 45 | 46 | 47 |
| p | 48 | 49 | 50 | 51 |
| q | 52 | 53 | 54 | 55 |
| r | 56 | 57 | 58 | 59 |

TABLE 4-continued

|   | P1 | P2 | P3 | P4 |
|---|----|----|----|----|
| s | 60 | 61 | 62 | 63 |
| t | 64 | 65 | 66 | 67 |
| u | 68 | 69 | 70 | 71 |
| v | 72 | 73 | 74 | 75 |
| w | 76 | 77 | 78 | 79 |
| x | 80 | 81 | 82 | 83 |
| y | 84 | 85 | 86 | 87 |
| z | 88 | 89 | 90 | 91 |

TABLE 5

|   | P1 | P2 | P3 |
|---|----|----|----|
| a | 00 | 01 | 02 |
| b | 03 | 04 | 05 |
| c | 06 | 07 | 08 |
| d | 09 | 10 | 11 |
| e | 12 | 13 | 14 |
| f | 15 | 16 | 17 |
| g | 18 | 19 | 20 |
| h | 21 | 22 | 23 |
| j | 24 | 25 | 26 |
| k | 27 | 28 | 29 |
| m | 30 | 31 | 32 |
| n | 33 | 34 | 35 |
| p | 36 | 37 | 38 |
| q | 39 | 40 | 41 |
| r | 42 | 43 | 44 |
| s | 45 | 46 | 47 |
| t | 48 | 49 | 50 |
| u | 51 | 52 | 53 |
| v | 54 | 55 | 56 |
| w | 57 | 58 | 59 |
| x | 60 | 61 | 62 |
| y | 63 | 64 | 65 |
| z | 66 | 67 | 68 |

TABLE 6

CONVERSION TABLE FOR SIX CHARACTER TRANSACTION SERIES

|   | P1 | P2 | P3 | P4 | P5 |
|---|-----|-----|-----|-----|-----|
| a | 000 | 001 | 002 | 003 | 004 |
| b | 005 | 006 | 007 | 008 | 009 |
| c | 010 | 011 | 012 | 013 | 014 |
| d | 015 | 016 | 017 | 018 | 019 |
| e | 020 | 021 | 022 | 023 | 024 |
| f | 025 | 026 | 027 | 028 | 029 |
| g | 030 | 031 | 032 | 033 | 034 |
| h | 035 | 036 | 037 | 038 | 039 |
| j | 040 | 041 | 042 | 043 | 044 |
| k | 045 | 046 | 047 | 048 | 049 |
| m | 050 | 051 | 052 | 053 | 054 |
| n | 055 | 056 | 057 | 058 | 059 |
| p | 060 | 061 | 062 | 063 | 064 |
| q | 065 | 066 | 067 | 068 | 069 |
| r | 070 | 071 | 072 | 073 | 074 |
| s | 075 | 076 | 077 | 078 | 079 |
| t | 080 | 081 | 082 | 083 | 084 |
| u | 085 | 086 | 087 | 088 | 089 |

TABLE 6-continued
CONVERSION TABLE FOR SIX CHARACTER TRANSACTION SERIES

|   | P1  | P2  | P3  | P4  | P5  |
|---|-----|-----|-----|-----|-----|
| v | 090 | 091 | 092 | 093 | 094 |
| w | 095 | 096 | 097 | 098 | 099 |
| x | 100 | 101 | 102 | 103 | 104 |
| y | 105 | 106 | 107 | 108 | 109 |
| z | 110 | 111 | 112 | 113 | 114 |

TABLE 7
CONVERSION TABLE FOR SEVEN CHARACTER TRANSACTION SERIES

|   | P1  | P2  | P3  | P4  | P5  | P6  | P7  |
|---|-----|-----|-----|-----|-----|-----|-----|
| a | 000 | 001 | 002 | 003 | 004 | 005 | 006 |
| b | 007 | 008 | 009 | 010 | 011 | 012 | 013 |
| c | 014 | 015 | 016 | 017 | 018 | 019 | 020 |
| d | 021 | 022 | 023 | 024 | 025 | 026 | 027 |
| e | 028 | 029 | 030 | 031 | 032 | 033 | 034 |
| f | 035 | 036 | 037 | 038 | 039 | 040 | 041 |
| g | 042 | 043 | 044 | 045 | 046 | 047 | 048 |
| h | 049 | 050 | 051 | 052 | 053 | 054 | 055 |
| j | 056 | 057 | 058 | 059 | 060 | 061 | 062 |
| k | 063 | 064 | 065 | 066 | 067 | 068 | 069 |
| m | 070 | 071 | 072 | 073 | 074 | 075 | 076 |
| n | 077 | 078 | 079 | 080 | 081 | 082 | 083 |
| p | 084 | 085 | 086 | 087 | 088 | 089 | 090 |
| q | 091 | 092 | 093 | 094 | 095 | 096 | 097 |
| r | 098 | 099 | 100 | 101 | 102 | 103 | 104 |
| s | 105 | 106 | 107 | 108 | 109 | 110 | 111 |
| t | 112 | 113 | 114 | 115 | 116 | 117 | 118 |
| u | 119 | 120 | 121 | 122 | 123 | 124 | 125 |
| v | 126 | 127 | 128 | 129 | 130 | 131 | 132 |
| w | 133 | 134 | 135 | 136 | 137 | 138 | 139 |
| x | 140 | 141 | 142 | 143 | 144 | 145 | 146 |
| y | 147 | 148 | 149 | 150 | 151 | 152 | 153 |
| z | 154 | 155 | 156 | 157 | 158 | 159 | 160 |

TABLE 8
CONVERSION TABLE FOR EIGHT CHARACTER TRANSACTION SERIES

|   | P1  | P2  | P3  | P4  | P5  | P6  | P7  | P8  |
|---|-----|-----|-----|-----|-----|-----|-----|-----|
| a | 000 | 001 | 002 | 003 | 004 | 005 | 006 | 007 |
| b | 008 | 009 | 010 | 011 | 012 | 013 | 014 | 015 |
| c | 016 | 017 | 018 | 019 | 020 | 021 | 022 | 023 |
| d | 024 | 025 | 026 | 027 | 028 | 029 | 030 | 031 |
| e | 032 | 033 | 034 | 035 | 036 | 037 | 038 | 039 |
| f | 040 | 041 | 042 | 043 | 044 | 045 | 046 | 047 |
| g | 048 | 049 | 050 | 051 | 052 | 053 | 054 | 055 |
| h | 056 | 057 | 058 | 059 | 060 | 061 | 062 | 063 |
| j | 064 | 065 | 066 | 067 | 068 | 069 | 070 | 071 |
| k | 072 | 073 | 074 | 075 | 076 | 077 | 078 | 079 |
| m | 080 | 081 | 082 | 083 | 084 | 085 | 086 | 087 |
| n | 088 | 089 | 090 | 091 | 092 | 093 | 094 | 095 |
| p | 096 | 097 | 098 | 099 | 100 | 101 | 102 | 103 |
| q | 104 | 105 | 106 | 107 | 018 | 109 | 110 | 111 |
| r | 112 | 113 | 114 | 115 | 116 | 117 | 118 | 119 |
| s | 120 | 121 | 122 | 123 | 124 | 125 | 126 | 127 |
| t | 128 | 129 | 130 | 131 | 132 | 133 | 134 | 135 |
| u | 136 | 137 | 138 | 139 | 140 | 141 | 142 | 143 |
| v | 144 | 145 | 146 | 147 | 148 | 149 | 150 | 151 |
| w | 152 | 153 | 154 | 155 | 156 | 157 | 158 | 159 |
| x | 160 | 161 | 162 | 163 | 164 | 165 | 166 | 167 |
| y | 168 | 169 | 170 | 171 | 172 | 173 | 174 | 175 |
| z | 176 | 177 | 178 | 179 | 180 | 181 | 182 | 183 |

TABLE 9
CONVERSION TABLE FOR NINE CHARACTER TRANSACTION SERIES

|   | P1  | P2  | P3  | P4  | P5  | P6  | P7  | P8  | P9  |
|---|-----|-----|-----|-----|-----|-----|-----|-----|-----|
| a | 000 | 001 | 002 | 003 | 004 | 005 | 006 | 007 | 008 |
| b | 009 | 010 | 011 | 012 | 013 | 014 | 015 | 016 | 017 |
| c | 018 | 019 | 020 | 021 | 022 | 023 | 024 | 025 | 026 |
| d | 027 | 028 | 029 | 030 | 031 | 032 | 033 | 034 | 035 |
| e | 036 | 037 | 038 | 039 | 040 | 041 | 042 | 043 | 044 |
| f | 045 | 046 | 047 | 048 | 049 | 050 | 051 | 052 | 053 |
| g | 054 | 055 | 056 | 057 | 058 | 059 | 060 | 061 | 062 |
| h | 063 | 064 | 065 | 066 | 067 | 068 | 069 | 070 | 071 |
| j | 072 | 073 | 074 | 075 | 076 | 077 | 078 | 079 | 080 |
| k | 081 | 082 | 083 | 084 | 085 | 086 | 087 | 088 | 089 |
| m | 090 | 091 | 092 | 093 | 094 | 095 | 096 | 097 | 098 |
| n | 099 | 100 | 101 | 102 | 103 | 104 | 105 | 106 | 107 |
| p | 108 | 109 | 110 | 111 | 112 | 113 | 114 | 115 | 116 |
| q | 117 | 118 | 119 | 120 | 121 | 122 | 123 | 124 | 125 |
| r | 126 | 127 | 128 | 129 | 130 | 131 | 132 | 133 | 134 |
| s | 135 | 136 | 137 | 138 | 139 | 140 | 141 | 142 | 143 |
| t | 144 | 145 | 146 | 147 | 148 | 149 | 150 | 151 | 152 |
| u | 153 | 154 | 155 | 156 | 157 | 158 | 159 | 160 | 161 |
| v | 162 | 163 | 164 | 165 | 166 | 167 | 168 | 169 | 170 |
| w | 171 | 172 | 173 | 174 | 175 | 176 | 177 | 178 | 179 |
| z | 180 | 181 | 182 | 183 | 184 | 185 | 186 | 187 | 188 |
| y | 189 | 190 | 191 | 192 | 193 | 194 | 195 | 196 | 197 |
| z | 198 | 199 | 200 | 201 | 202 | 203 | 204 | 205 | 206 |

TABLE 10
CONVERSION TABLE FOR TEN CHARACTER TRANSACTION SERIES

|       | P1  | P2  | P3  | P4  | P5  | P6  | P7  | P8  | P9  | P10 |
|-------|-----|-----|-----|-----|-----|-----|-----|-----|-----|-----|
| a 000 | 001 | 002 | 003 | 004 | 005 | 006 | 007 | 008 | 009 |     |
| b 010 | 011 | 012 | 013 | 014 | 015 | 016 | 017 | 018 | 019 |     |
| c 020 | 021 | 022 | 023 | 024 | 025 | 026 | 027 | 028 | 029 |     |
| d 030 | 031 | 032 | 033 | 034 | 035 | 036 | 037 | 038 | 039 |     |
| e 040 | 041 | 042 | 043 | 044 | 045 | 046 | 047 | 048 | 049 |     |
| f 050 | 051 | 052 | 053 | 054 | 055 | 056 | 057 | 058 | 059 |     |
| g 060 | 061 | 062 | 063 | 064 | 065 | 066 | 067 | 068 | 069 |     |
| h 070 | 071 | 072 | 073 | 074 | 075 | 076 | 077 | 078 | 079 |     |
| j 080 | 081 | 082 | 083 | 084 | 085 | 086 | 087 | 088 | 089 |     |
| k 090 | 091 | 092 | 093 | 094 | 095 | 096 | 097 | 098 | 099 |     |
| m 100 | 101 | 102 | 103 | 104 | 105 | 106 | 107 | 108 | 109 |     |
| n 110 | 111 | 112 | 113 | 114 | 115 | 116 | 117 | 118 | 119 |     |
| p 120 | 121 | 122 | 123 | 124 | 125 | 126 | 127 | 128 | 129 |     |
| q 130 | 131 | 132 | 133 | 134 | 135 | 136 | 137 | 138 | 139 |     |
| r 140 | 141 | 142 | 143 | 144 | 145 | 146 | 147 | 148 | 149 |     |
| s 150 | 151 | 152 | 153 | 154 | 155 | 156 | 157 | 158 | 159 |     |
| t 160 | 161 | 162 | 163 | 164 | 165 | 166 | 167 | 168 | 169 |     |
| u 170 | 171 | 172 | 173 | 174 | 175 | 176 | 177 | 178 | 179 |     |
| v 180 | 181 | 182 | 183 | 184 | 185 | 186 | 187 | 188 | 189 |     |
| w 190 | 191 | 192 | 193 | 194 | 195 | 196 | 197 | 198 | 199 |     |
| x 200 | 201 | 202 | 203 | 204 | 205 | 206 | 207 | 208 | 209 |     |
| y 210 | 211 | 212 | 213 | 214 | 215 | 216 | 217 | 218 | 219 |     |
| z 220 | 221 | 222 | 223 | 224 | 225 | 226 | 227 | 228 | 229 |     |

One embodiment of my invention, for a five character transaction series, is a consecutive transaction numbering apparatus comprising an AMS having operable accessibility to the following 23 lower case alphabetical characters in alphabetical retrievable order:

a, b, c, d, e, f, g, h, j, k, m, n, p, q, r, s, t, u, v, w, x, y and z.

This embodiment comprises four NMR's, each of which has operable accessibility to all 10 arabic numerals in numerical retrievable order.

This embodiment further comprises a printing means for printing a transaction number directly on a document.

This embodiment further comprises a means to initialize each of the memory registers so that the AMS has an "a" in its print position and the AMS in in the first series print position, i.e., the series print position furthest to the left relative to the series print positions of the NMR's. This means to initialize is also operable to position a "0" in the print position of the NRM's in the second, third and fourth series print position, and a "1" in the print position of the NRM farthest to the right, i.e., the fifth series print position. Therefore, upon first use, the means to initialize will position in the print position the transaction number "a0001".

This embodiment also comprises a means to increment as a group the four numeric characters, which are in a print position in the four NMR's, by one. For example, after printing on the first document the transaction number "a0001", the means to initialize will advance to the print position the transaction number "a0002". However, had the last transaction number been, for example, "a9999", this means to initialize would advance all "9's" to "0's" and simultaneously interchange the series print position of the "a", i.e., the first series print position, with the series print position of the first NMR, so as to advance to the print position the transaction number "0a000".

This embodiment also comprises a means to increment the print position of the AMS, when the print position of the AMS is in the fifth series print position and all numeric characters in the print position are "9's". For example, if the last transaction number printed on a document was "9999a", then this means to increment would shift the series print position of the AMS from the fifth series print position to the first series print position, advance the alphabetic character in the print position of the AMS from "a" to "b", shift the series print position of the first NMR from the first series print position to the second series print position, shift the series print position of the second NMR from the second series print position to third series print position, shift the series print position of the third NMR from the third series print position to the fourth series print position, shift the series print position of the fourth NMR from the fourth series print position to the fifth series print position, and advance all "9" in each of the print positions of each NMR to "0". In this example, if the last printed transaction number was "9999a", then the means to increment would shift and advance to the print position the transaction number "b0000".

EXAMPLE 1

For demonstration, an IBM System 370 computer and IBM model 1403 printer were used. However, any computer with a COBOL compiler will work with the program described below, which is written in COBOL language. Although the program described below sets up the circuitry and system for producing transaction numbers, it is to be understood that any equivalent apparatus or circuitry which will be operable for producing transaction numbers in accordance with the invention described herein and having one and only one non-numeric character and one or more numeric characters, is within the scope of this invention.

A transaction series consisting of three characters was selected. A 23 byte alphabetical table consisting of the letters:

A, B, C, D, E, F, G, H, J, K, M, N, P, Q, R, S, T, U, V, W, X, Y and Z was programmer created as part of the source listing. An example of the source program used to produce the three character transaction series is given in Table 11.

The above described circuitry produce the following transaction numbers in the sequential order indicated below:

A01 to A99,
0A0 to 9A9,
00A to 99A,
B99 to B99
9B9 to 9B9,
00B to 99B, and so on until transaction number 99Z is produced.

A novel feature of the apparatus or circuitry set up as described above, is the movement of the non-numeric character, after the first 99 transaction numbers have been produced, from the first series print position, to the second series print position; the movement of the non-numeric character, after the next 100 transaction numbers have been produced, to the third print position; the advancing of the print position of the non-numeric character to the next-in-alphabetical-order non-numeric character in the programmer-supplied alphabetical table and the shifting of the series print position of the programmer-supplied alphabetical table from the third series print position to the first series print position; and so on until the three character transaction series is exhausted.

TABLE 11

```
IDENTIFICATION DIVISION.
PROGRAM-ID. PROB13.
AUTHOR. R. M. BRUCE, COPYRIGHT 1982
ENVIRONMENT DIVISION.
CONFIGURATION SECTION.
SOURCE-COMPUTER. IBM-370.
OBJECT-COMPUTER. IBM-370.
INPUT-OUTPUT SECTION.
FILE-CONTROL.
SELECT PRTOUT ASSIGN TO SYS006-UR-1403-S.
DATA DIVISION.
FILE SECTION.
ID    PRTOUT.
      RECORD CONTAINS 133 CHARACTERS LABEL
      RECORDS ARE OMITTED
      RECORDING MODE IS F DATA RECORD IS PREC.
01    PREC             PIC X(133).
WORKING-STORAGE SECTION.
77    NCNT             PIC 9(11)     VALUE ZERO COMP.
77    SAB              PIC 9(4)      VALUE ZERO COMP.
77    SWP              PIC 9         VALUE ZERO.
77    CSW              PIC 9         VALUE ZERO.
01    HLTRS.
      02  LTRS         PIC X(23)     VALUE
          'ABCDEFGHJKMNPQRSTUVWXYZ'.
      02  HLTR REDEFINES LTRS.
          04  ALTR OCCURS 23 TIMES PIC X.
01    HERBNO
      02  NNC          PIC X.
      02  NUMB.
          04  NC3      PIC 9         VALUE ZERO.
          04  NC2      PIC 9         VALUE ZERO.
          04  NC1      PIC 9         VALUE ZERO.
      02  LEON REDEFINES NUMB.
          04  PCNT     PIC 9(3).
01    HLINE.
      02  FILLER       PIC X(20)     VALUE SPACES.
      02  P1           PIC X.
      02  P2           PIC X.
      02  P3           PIC X.
      02  FILLER       PIC X(110)    VALUE SPACES.
PROCEDURE DIVISION.
MAINLINE.
OPEN OUTPUT PRTOUT.
PERFORM CONDITIONING THRU C-EXIT.
PERFORM HERB THRU H-EXIT UNTIL NCNT > 305.
CLOSE PRTOUT.
STOP RUN.
CONDITIONING.
MOVE 1 TO SAB.
MOVE 'A' TO NNC.
C-EXIT.
EXIT.
HERB.
ADD 1 TO NCNT.
```

TABLE 11-continued

```
ADD 1 TO PCNT.
IF PCNT < 100    MOVE 1 TO SWP GO TO SAM.
IF PCNT < 200    MOVE 2 TO SWP GO TO SAM.
IF PCNT < 300    MOVE 3 TO SWP GO TO SAM.
IF PCNT = 300    MOVE 1 TO SWP
                 MOVE ZERO TO PCNT
                 MOVE 7 TO CSW.
SAM.
IF CSW = 7 MOVE ZERO TO CSW
PERFORM NNC-RTN THRU N-EXIT.
JIM.
IF SWP = 1
MOVE NC1 TO P3, MOVE NC2 TO P2
MOVE NNC TO P1, GO TO BILL.
IF SWP = 2
MOVE NC1 TO P3, MOVE NNC TO P2
MOVE NC2 TO P1, GO TO BILL.
IF SWP = 3
MOVE NNC TO P3, MOVE NC1 TO P2
MOVE NC2 TO P1, GO TO BILL.
BILL.
WRITE PREC FROM HLINE AFTER ADVANCING 1 LINES.
H-EXIT.
EXIT.
NNC-RTN.
ADD 1 TO SAB.
IF SAB > 23 MOVE 0001 TO SAB.
MOVE ALTR (SAB) TO NNC.
N-EXIT.
EXIT.
```

EXAMPLE 2

For a second demonstration, the IBM System 370 computer and IBM Model 1403 printer were again used, however, a RPG II language compiler was used instead of a COBOL compiler, as used in Example 1.

An example of the source program used to produce a six character transaction series is given in Table 12. The data in the input file "ICR03F01" was fictitious and was used only for demonstration.

As can be seen, the RPG II language compiler is more difficult to use, and less efficient with this invention than the COBOL language compiler.

An example of the transactions, identified by transaction numbers produced by the circuitry created by this embodiment of my invention is given in Table 13. The transaction numbers are referred to as "HERB NO" in Table 13.

In this regard, just as my invention offers an apparatus or means, in effect, for superimposing a predetermined sequence over the business arena for purposes of marking and recording transactions—my invention can also be used for giving "number-labels" to addresses along a network. For example, were the present zip code system labeled with transaction numbers marked by my invention, there could be 11½ times the present amount of zips—while still using only five characters.

While the invention has been described with respect to preferred embodiments, it should be understood that various changes and modifications may be made to the apparatus and system as herein described, without departing from the spirit and scope of the present invention.

TABLE 12

```
FCR03F01    IPEAF3200      80           DISK 14    SYS030S
FPRTOUT     C      F           132 OV   PRINTERSYSLST
ICR03F01    FO    91  80        C4
I                                            1       40CNO
I                                            5       20 NAME
I                                           21       262AMT
C   N84                    MOVE 'A'      NNNC         1
C                          SETON                              84
C           TCNT           ADD 1         TCNT        80
C           PCNT           ADD 1         PCNT        60
C           100000         COMP PCNT                      414242
C           42200000       COMP PCNT                      424343
C           43300000       COMP PCNT                      434444
C           44400000       COMP PCNT                      444545
C           45500000       COMP PCNT                      454646
C           46600000       COMP PCNT                          41
C      41  46              Z-ADDO        PCNT
C      41  46              SETOF                       46
C           TAMT           ADD AMT       TAMT       122
Q           NC1            ADD 1         NC1         10
C           NC1            COMP 0                              32
C         32NC2            ADD 1         NC2         10
C         32NC2 COMP 0                                        33
C         33NC3            ADD 1         NC3         10
C         33NC3            COMP 0                             34
C         34NC4            ADD 1         NC4         10
C         34NC4            COMP 0                             35
C         35NC5            ADD 1         NC5         10
C         35NC5            COMP 0                             36
C         36NNC            COMP 'A'                           02
C         36NNC            COMP 'B'                           03
C         36NNC            COMP 'C'                           04
C         36NNC            COMP 'D'                           05
C         36NNC            COMP 'E'                           06
C         36NNC            COMP 'F'                           07
C         36NNC            COMP 'G'                           08
C         36NNC            COMP 'H'                           09
C         36NNC            COMP 'J'                           10
C         36NNC            COMP 'K'                           11
C         36NNC            COMP 'M'                           12
C         36NNC            COMP 'N'                           13
C         36NNC            COMP 'P'                           14
C         36NNC            COMP 'Q'                           15
```

TABLE 12-continued

| | | | | | |
|---|---|---|---|---|---|
| C | 36NNC | COMP 'R' | | | 16 |
| C | 36NNC | COMP 'S' | | | 17 |
| C | 36NNC | COMP 'T' | | | 18 |
| C | 36NNC | COMP 'U' | | | 19 |
| C | 36NNC | COMP 'V' | | | 20 |
| C | 36NNC | COMP 'W' | | | 21 |
| C | 36NNC | COMP 'X' | | | 22 |
| C | 36NNC | COMP 'Y' | | | 23 |
| C | 36NNC | COMP 'Z' | | | 01 |
| C | | SETOF | | | 363534 |
| C | | SETOF | | | 3332 |
| C | 02 | MOVE 'B' | NNC | | |
| C | 03 | MOVE 'C' | NNC | | |
| C | 04 | MOVE 'D' | NNC | | |
| C | 05 | MOVE 'E' | NNC | | |
| C | 06 | MOVE 'F' | NNC | | |
| C | 07 | MOVE 'G' | NNC | | |
| C | 08 | MOVE 'H' | NNC | | |
| C | 09 | MOVE 'J' | NNC | | |
| C | 10 | MOVE 'K' | NNC | | |
| C | 11 | MOVE 'M' | NNC | | |
| C | 12 | MOVE 'N' | NNC | | |
| C | 13 | MOVE 'P' | NNC | | |
| C | 14 | MOVE 'Q' | NNC | | |
| C | 15 | MOVE 'R' | NNC | | |
| C | 16 | MOVE 'S' | NNC | | |
| C | 17 | MOVE 'T' | NNC | | |
| C | 18 | MOVE 'U' | NNC | | |
| C | 19 | MOVE 'V' | NNC | | |
| C | 20 | MOVE 'W' | NNC | | |
| C | 21 | MOVE 'X' | NNC | | |
| C | 22 | MOVE 'Y' | NNC | | |
| C | 23 | MOVE 'Z' | NNC | | |
| C | 01 | MOVE 'A' | NNC | | |
| OPRTOUT | H | 301 | OV | | |
| O | OR | | IP | | |
| O | | | | 39 | 'SIX CHARACTER HERB"S' |
| O | | | | 53 | 'WAY IN RPG II' |
| O | | | UPDATE Y | 80 | |
| O | | | | 104 | 'PAGE' |
| O | | | PAGE Z | 108 | |
| O | H | 33 | OV | | |
| O | OR | | IP | | |
| O | | | | 26 | 'HERB NO' |
| 0 | | | | 46 | 'ACCT NO' |
| O | | | | 72 | 'CUSTOMER NAME' |
| O | | | | 108 | 'AMOUNT' |
| O | D | 1 | 91 41 | | |
| O | | | NNC | 20 | |
| O | | | NC5 | 21 | |
| O | | | NC4 | 22 | |
| 0 | | | NC3 | 23 | |
| O | | | NC2 | 24 | |
| 0 | | | NC1 | 25 | |
| O | | | CNO Z | 44 | |
| O | | | NAME | 74 | |
| O | | | AMT 1 | 108 | |
| O | D | 1 | 91 42 | | |
| O | | | NC5 | 20 | |
| O | | | NNC | 21 | |
| O | | | NC4 | 22 | |
| O | | | NC3 | 23 | |
| O | | | NC2 | 24 | |
| O | | | NC1 | 25 | |
| O | | | CNO Z | 44 | |
| O | | | NAME | 74 | |
| O | | | AMT 1 | 108 | |
| O | D | 1 | 91 43 | | |
| O | | | NC5 | 20 | |
| O | | | NC4 | 21 | |
| O | | | NNC | 22 | |
| O | | | NC3 | 23 | |
| O | | | NC2 | 24 | |
| O | | | NC1 | 25 | |
| O | | | CNO Z | 44 | |
| O | | | NAME | 74 | |
| O | | | AMT 1 | 108 | |
| O | D | 1 | 91 44 | | |
| O | | | NC5 | 20 | |
| O | | | NC4 | 21 | |
| O | | | NC3 | 22 | |
| O | | | NNC | 23 | |

TABLE 12-continued

| | | | | | |
|---|---|---|---|---|---|
| O | | | NC2 | | 24 |
| O | | | NC1 | | 25 |
| O | | | CNO | Z | 44 |
| O | | | NAME | | 74 |
| O | | | AMT | 1 | 108 |
| O | D | 1 | 91 45 | | |
| O | | | NC5 | | 20 |
| O | | | NC4 | | 21 |
| O | | | NC3 | | 22 |
| O | | | NC2 | | 23 |
| O | | | NNC | | 24 |
| O | | | NC1 | | 25 |
| O | | | CNO | Z | 44 |
| O | | | NAME | | 74 |
| O | | | AMT | 1 | 108 |
| O | D | 1 | 91 46 | | |
| O | | | NC5 | | 20 |
| O | | | NC4 | | 21 |
| O | | | NC3 | | 22 |
| O | | | NC2 | | 23 |
| O | | | NC1 | | 24 |
| O | | | NNC | 25 | |
| O | | | CNO | Z | 44 |
| O | | | NAME | | 74 |
| O | | | AMT | 1 | 108 |
| O | T | 3 | LR | | |
| O | | | | | 37 'TRANSACTIONS TODAY' |
| O | | | TCNT | Z | 45 |
| O | | | | | 85 'TODAY'S DOLLAR AMOUNT' |
| O | | | TAMT | 1 | 108 |

TABLE 13

| HERB NO | ACCT NO | CUSTOMER NAME | AMOUNT |
|---|---|---|---|
| A00001 | 1111 | RAY NEWELL | 1,967.89 |
| A00002 | 1112 | MARK PELTZMAN | 656.78 |
| A00003 | 1113 | PETER CONROY | 2,845.67 |
| A00004 | 1114 | LARRY MURPHY | 34.56 |
| A00005 | 1115 | DON SMITH | 3,723.45 |
| A00006 | 1116 | RICHARD BLAKE | 12.34 |
| A00007 | 1117 | BILL EDWARDS | 1,001.23 |
| A00008 | 1118 | DAVE SIMMONS | 10.12 |
| A00009 | 1119 | MARSHA WIGGINS | 9,999.99 |
| A00010 | 1120 | DOMINGO OCHOA | .01 |
| A00011 | 1121 | RICHARD SALAS | 2.21 |
| A00012 | 1122 | SANFORD WONG | 6,543.32 |
| A00013 | 1123 | PHILLIP WOLFE | 4.43 |
| A00014 | 1124 | MIKE GREEN | 5,325.54 |
| A00015 | 1125 | WILLIE COOKS | 6.65 |
| A00016 | 1126 | JAMES STRANGE | 7.76 |
| A00017 | 1127 | MARJORIE MAYBREY | 3,108.87 |
| A00018 | 1128 | JUANITA PICKENS | 9.98 |
| A00019 | 1129 | ROBERT ROBERTSON | 2,670.09 |
| A00020 | 1130 | WALTER RALEIGH | 2.10 |
| A00021 | 1131 | JACK DANIELS | 3.21 |
| A00022 | 1132 | SAM SYKES | 1,894.32 |
| A00023 | 1133 | WILE E COYOTE | 5.43 |
| A00024 | 1134 | LLOYD DESMARIAS | 6.54 |
| A00025 | 1345 | MARJORIE MABREY | 15.00 |
| A00026 | 1442 | MAE MABREY | 55.79 |
| A00027 | 1735 | EDWIN MABREY | 132.11 |
| A00028 | 1946 | CHARLEY MABREY | 32.00 |
| A00029 | 2031 | JACK MABREY | 1,013.75 |
| A00030 | 4136 | YVONNE MABREY | 31.03 |
| A00031 | 4174 | EDDIE MABREY | 932.74 |
| A00032 | 4913 | ALTHEA BALDWIN | 7,134.93 |
| A00033 | 5013 | LAJUANA CHATMAN | 30.95 |
| A00034 | 5107 | TRACEY MABREY | 173.94 |
| A00035 | 5108 | TERRU MABREY | 39.71 |
| A00036 | 5197 | RUTH CHATMAN | 5,941.01 |
| A00037 | 5394 | SAMUEL BALDWIN | 39.11 |
| A00038 | 5411 | GERALD HOLMAN | 717.19 |
| A00039 | 5417 | J J JACKSON | 5,555.55 |
| A00040 | 5419 | GLEN ARRINGTON | 839.14 |
| TRANSACTIONS TODAY 40 | | TODAY'S DOLLAR AMOUNT | 62,526,44 |

I claim:

1. A consecutive transaction numbering apparatus comprising:
   a. an alphabetical memory system having operable accessibility to a predetermined number of unique alphabetical characters in alphabetically retrievable order, and having a print position for only one of said alphabetical characters at a time;
   b. at least one or more numeric memory registers, each of said numeric memory registers having operable accessibility to number characters representative of all ten arabic numerals arranged in numerically retrievable order, and having a print position for only one of said number characters at a time;
   c. marking means operable for marking a transaction number upon the occurrence of a transaction which transaction number consists of a plurality of print positions including one and only one alphabetical character from said alphabetical memory system and one number character from each of said numeric memory registers, such that the characters of said marked transaction number are arranged in adjacent sequential order;
   d. means to initialize said alphabetical memory system and said numeric memory registers so that said alphabetical memory system has the first-in-alphabetical-order of its accessible characters in the series print position farthest to the left relative to each of said numeric memory registers, and so that said numeric memory register which is in a series print position farthest to the right has a "1" in its print position, and each remaining numeric register has a "0" in its print position;
   e. means to increment said numeric memory registers after each transaction number is marked by advancing, as a group, the numeric characters in the print position by one, and when all numeric characters in the print position are "9" and when said alphabetical memory system is not in the series print position farthest to the right, by advancing all numeric characters in the print position to "0" and interchanging the series print position of the alphabetical memory system with the series print position of the numeric memory register immediately to the right of the series print position of said alphabetical memory system; and f. means to increment said alphabetical memory system when said alphabetical memory system is in the series print position farthest to the right relative to the series print position of each numeric memory register, and said numeric character in the print position of each numeric memory register is "9", after such transaction number has been marked and to reposition the series print position of said alphabetical memory system by shifting it to the farthest series print position to the left, and to shift the series print position of each numeric memory register one series print position to the right of its former series print position, and to advance all numeric characters in print position in each numeric memory register to "0".

2. The apparatus of claim 1 wherein said alphabetical characters consist of the following letters:

a, b, c, d, e, f, g, h, j, k, m, n, p, q, r, s, t, u, v, w, x, y and z.

3. The apparatus of claim 1 or 2 wherein the number of said numeric memory registers is no greater than 9.

4. The apparatus of claim 1 or 2 wherein said apparatus comprises an electronic computer system.

5. A consecutive transaction numbering apparatus comprising:
a. a non-numeric memory system having operable accessibility to a predetermined number of unique non-numeric characters in predetermined individual, retrievable, sequential order, and having a print position for only one of said non-numeric characters at a time;
b. one or more numeric memory registers, each of said numeric memory registers having operable accessibility to numeric characters representing all 10 arabic numerals in numerically retrievable order, and having a print position for only one of said numeric characters at a time;
c. a marking means operable for marking a transaction number which consist of one and only one character from said non-numeric memory system and from each of said numeric memory registers, such that the characters of said marked transaction number are arranged in adjacent sequential order;
d. a means to initialize said non-numeric memory system and said numeric memory registers so that said non-numeric memory system has the first-in-predetermined-individual-sequential-order of its accessible characters in print position, and so said non-numeric memory system is in the series print position farthest to the left relative to each of said numeric memory registers, and so that said numeric memory register which is in a series print position farthest to the right has a "1" in its print position, and so that each numeric register which is not in a series print position farthest to the right has a "0" in its print position;
e. a means to increment said one or more numeric memory registers after each transaction number is marked on a transaction, by advancing as a group, the numeric characters in the print position by one, and when all numeric characters in the print position are "9" and when said non-numeric memory system is not in the series print position farthest to the right, by advancing all numeric characters in the print position to "0" and interchanging the series print position of the non-numeric memory system with the series print position of the numeric memory register immediately on the right of the series print position of said non-numeric memory system; and f. a means to increment said non-numeric memory system when said non-numeric memory system is in the series print position farthest to the right relative to the series print position of each numeric memory register, and said numeric character in the print position of each numeric memory register is "9", after such transaction number has been marked on the transaction, and to reposition the series print position of said non-numeric memory system by shifting it to the farthest series print position to the left and to shift the series print position of each numeric memory register one series print position to the right of its former series print position, and to advance all numeric characters in print position in each numeric memory register to "0".

6. The apparatus of claim 5 wherein the number of said numeric memory registers is no greater than 9.

7. The apparatus of claim 5 or 6 wherein said apparatus comprises an electronic computer system.

8. A system comprising:
a. a first means to read transaction numbers of a transaction series which consists of a predetermined number of at least two characters,
each transaction number consisting of one and only one non-numeric character, all other characters in said transaction number being numeric characters,
said first means being operable to generate a prefix signal and a suffix signal,
each prefix signal uniquely corresponding to the identity of said non-numeric character in its transaction number, and the series print position of said non-numeric character in its transaction number,
each suffix signal uniquely corresponding to the identity and the sequential order of said numeric characters in its transaction number, without regard to the identity of or series print position of said non-numeric character in its transaction number;
b. a second means to convert each prefix signal to a corresponding prefix sub-series of sequential characters all of which are numeric characters, or signals corresponding thereto;
c. a third means to convert each suffix signal to a corresponding suffix sub-series of sequential characters all of which are numeric characters, or signals corresponding thereto;
d. a fourth means to combine such prefix sub-series or signals corresponding thereto, and such suffix sub-series or signals corresponding thereto, to produce an equivalent decimal number which consists entirely of sequential numeric characters;

said first, second, third and fourth means being operable in combination such that for each transaction number there is produced a unique equivalent decimal number.

9. The system of claim 8 wherein said non-numeric character is an alphabetical character selected from the following letters:

a, b, c, d, e, f, g, h, j, k, m, n, p, q, r, s, t, u, v, w, x, y and z.

10. The system of claim 8 or 9 wherein said system comprises an electronic computer system.

11. A method of producing consecutive transaction numbers including alphanumeric characters in prescribed locations in said numbers, comprising:
   a. storing a predetermined number of unique alphabetic characters in alphabetically retrievable order;
   b. storing a plurality of numeric characters in numerically retrievable order;
   c. producing a transaction number upon the occurrence of a transaction which transaction number comprises one of said alphabetic characters and at least one of said numeric characters such that said numeric characters of consecutive transaction number are arranged in sequential order;
   d. initializing said alphabetic characters and said numeric characters so that a first of said alphabetic characters in alphabetically retrievable order appears in a first position which is farthest to the left relative to said transaction number and so that said numeric characters which form the remainder of said transaction number to the right of said alphabetic character assume the least numeric value permitted by said numeric characters;
   e. incrementing said numeric characters, as a group, by a prescribed value, after each transaction number is produced until each of the numeric characters in said transaction number is a "9" and then concurrently repositioning said alphabetical character to the right relative to said transaction number and replacing said alphabetic character with a numeric character and incrementing all of said numeric characters to "0"; and
   f. incrementing said alphabetical character to the next character in alphabetical order only when said first alphabetical character has been repositioned through said transaction number and repositioning the incremented alphabetic character to the first position in said transaction number and advancing each numeric character to 0 to begin a new series of transaction numbers.

12. The method recited in claim 11 including the steps of,
   repeating steps e and f until all said alphabetic characters have been repositioned through said transaction number.

13. The method recited in claim 11 including the step of:
   g. terminating the production of transaction numbers when said alphabetic character has reached its maximum value in the rightmost position in said transaction number and all of said numeric characters have simultaneously reach their respective maximum values.

14. A consecutive transaction numbering apparatus comprising:
   a. first memory means for storing a predetermined number of unique non-numeric characters in a predetermined sequential order;
   b. second memory means for storing numeric characters in numerically sequential order;
   c. output means for producing a transaction number upon occurrence of a transaction which transaction number consists of one non-numeric character from said first memory means and at least one numeric character from said second memory means such that said transaction numbers are arranged in adjacent sequential order;
   d. initializing means connected to first memory means and to said second memory means so that said first memory means has the first character in said predetermined sequential order in a first position which is farthest to the left relative to said transaction number, and so that said second memory means has the first character in said numerically sequential order in a first position to the right of said first character produced by said first memory means;
   e. first incrementing means connected to said second memory means and operable, after each transaction number is produced, to advance the numeric characters by one as a group, and to selectively interchange the position of the non-numeric character with the position of the numeric character immediately on the right of said non-numeric character; and
   f. second incrementing means connected to said first memory means and operable to increment said non-numeric character when it is in the position farthest to the right relative to said transaction number and each said numeric character is "9", after such transaction number has been produced and to reposition the incremental non-numeric character to the farthest left position, shifting the position of each numeric character to the right and incrementing all numeric characters to "0".

15. The apparatus recited in claim 14 wherein, said second memory means includes a plurality of registers for producing numeric characters.

* * * * *